United States Patent
Sano et al.

(10) Patent No.: US 6,749,649 B2
(45) Date of Patent: Jun. 15, 2004

(54) METHOD AND DEVICE FOR MOUNTING CELL

(75) Inventors: Akihiro Sano, Neyagawa (JP); Fumio Daio, Nara (JP); Daisuke Yoshida, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 238 days.

(21) Appl. No.: 10/041,869

(22) Filed: Oct. 25, 2001

(65) Prior Publication Data

US 2002/0086191 A1 Jul. 4, 2002

Related U.S. Application Data

(62) Division of application No. 09/212,964, filed on Dec. 16, 1998, now Pat. No. 6,376,109.

(30) Foreign Application Priority Data

Dec. 22, 1997 (JP) .............................. 9-353297
Jun. 8, 1998 (JP) ........................... 10-159077
Nov. 4, 1998 (JP) ........................... 10-312903

(51) Int. Cl.[7] .......................... H01M 6/00; H01M 2/00; H01M 2/26
(52) U.S. Cl. .......................... 29/623.1; 429/1; 429/121; 429/114
(58) Field of Search .............................. 29/623.1; 429/1, 429/121, 123, 164, 247, 337, 117, 114

(56) References Cited

U.S. PATENT DOCUMENTS

| 4,725,515 A | * | 2/1988 | Jurca | .......................... 429/174 |
| 5,763,112 A | * | 6/1998 | Redford | ........................ 429/1 |
| 6,365,299 B1 | * | 4/2002 | Miyaki et al. | ........... 429/218.1 |

* cited by examiner

Primary Examiner—Stephen Kalafut
Assistant Examiner—Raymond Alejandro
(74) Attorney, Agent, or Firm—Jordan and Hamburg LLP

(57) ABSTRACT

A method of attaching a battery cell in an apparatus acted upon by centrifugal force avoids an extreme decline in discharge capacity of the battery cell when acted upon by the centrifugal force. The battery, of the type including a positive polarity material and a negative polarity material which are placed in opposition in a thickness direction of a battery case with an intervening separator disposed therebetween, and a liquid electrolyte packed inside the battery case, is mounted in the apparatus, oriented such that a negative polarity material side of the battery cell faces generally in a direction in which the centrifugal force acts on the apparatus, and an angle of inclination of a thickness direction of the battery cell is within a range of 0 to about 60 degrees relative to the direction of the centrifugal force.

6 Claims, 3 Drawing Sheets

METHOD AND DEVICE FOR MOUNTING CELL

REFERENCE TO RELATED APPLICATION

This is a division of application Ser. No. 09/212,964, filed Dec. 16, 1998 now U.S. Pat. No. 6,376,109.

BACKGROUND OF THE INVENTION

1. Field of the Invention

This invention relates to an attachment method and attachment device for battery cells installed in locations subjected to centrifugal forces.

2. Description of the Related Art

Apparatuses which use battery cells as power supplies are not limited to portable equipment, and various utilization configurations are now being developed. Among these applications are automobiles, space observation equipment, and various types of industrial equipment wherewith battery cells need to be used in environments affected by centrifugal forces. In battery cell applications in apparatuses designed for measuring and monitoring air pressure of an automobile tire while the vehicle is moving, for example, the centrifugal force developed by tire revolution acts on the battery cells. The conditions affecting such battery cells when subjected to centrifugal forces are now described.

The chemical reactions that take place in battery cells are based on ion conduction in liquid electrolytes that are present between a positive polarity material and a negative polarity material. In general, liquid electrolytes are present in a condition wherein they are impregnated in separators placed between the positive polarity material and the negative polarity material, in which condition they contribute to oxidation-reduction reactions between positive and negative electrodes. More specifically, if the active material of positive electrode (positive polarity material) is designated P1, and the active material of negative electrode (negative polarity material) is designated N1, then the reaction that proceeds at the positive pole is represented by chemical equation (1), and the reaction that proceeds at the negative pole is represented by chemical equation (2).

Positive Pole: $P1 + ne \rightarrow P2$     (1)

Negative Pole: $N1 \rightarrow N2 + ne$     (2)

When the reactions expressed by the chemical equations (1) and (2) come into contact via the liquid electrolyte, a DC current can be sent to a circuit connected to the battery cell, whereupon the electricity generating reactions of the battery cell proceed. When such battery cell reactions as these are subjected to centrifugal forces, due to electrolyte flow induced by the centrifugal forces, the electrolyte available for contributing to the electricity generating reactions sometimes decreases, resulting in a decline in battery cell performance. This is now described in the case of a graphite-lithium fluoride battery cell, which is one example of a non-aqueous liquid electrolyte battery cell.

In the graphite-lithium fluoride battery cell, as diagrammed in FIG. 1, a negative electrode 2 formed as a disk made from lithium metal and a positive electrode 3 formed as a disk made from a material of which main component is graphite fluoride are stacked in a battery case 5 made of stainless steel, separated by a separator 4 formed of unwoven polypropylene fabric. The interior of this battery case 5 is filled with a liquid electrolyte wherein lithium borofluoride is dissolved in a liquid mixture of dimethoxy ethane (DME) having a low boiling point and either gamma butyrolactone or propylene carbonate having a high boiling point to bring the volumetric concentration thereof to 1 mol/liter. The opening in the battery case 5 is sealed by a sealing plate 1 made of stainless steel that doubles as a negative terminal, with an intervening gasket 6 formed of a polypropylene resin.

When a centrifugal force acts in the thickness direction on a flat battery cell such as this, an electrolyte that exhibits mobility will move in the direction of the centrifugal force toward one or other of the electrodes, whereupon the volume of electrolyte available for contributing to the electricity generating reactions of the battery cell at the other electrode will decrease. This results in a decline in such battery performance factors as discharge capacity and discharge characteristics, as compared to when the battery cell is used in a normal condition unaffected by centrifugal forces.

SUMMARY OF THE INVENTION

An object of the present invention is to provide a battery cell attachment method and attachment device for battery cell applications in environments subjected to centrifugal forces, wherewith battery cell performance does not decline.

What is characteristic of the battery cell attachment method of the present invention is that, when a battery cell wherein positive polarity material and negative polarity material are placed in opposition through a separator or separators in a battery case, and a liquid electrolyte is packed between the positive polarity material and the negative polarity material, is attached in an apparatus installed in a place acted on by centrifugal forces, the battery cell is attached in the apparatus so that one side where the negative polarity material exists faces in a direction in which the centrifugal force is acting on the apparatus. By attaching the battery cell so that the negative polarity material faces in the direction of centrifugal force in this manner, a condition is maintained wherein the liquid electrolyte that flows due to the centrifugal force is present on the opposite side of the negative polarity material that becomes the depolarized side during discharge, and battery cell performance deterioration due to centrifugal force is prevented.

What is further characteristic of the battery cell attachment method of the present invention is that, when a battery cell wherein positive polarity material and negative polarity material are placed in opposition through a separator or separators in a battery case, and a liquid electrolyte is packed between the positive polarity material and the negative polarity material, is attached in an apparatus installed in a place acted on by centrifugal forces, the battery cell is attached in the apparatus so that the negative polarity material side is oriented with respect to the direction in which the centrifugal force acts on the apparatus so that the angle of inclination of the battery cell thickness direction is within a range of 0 to 60 degrees. The liquid electrolyte present at the reaction surface of the negative polarity material decreases the more as the inclination of the thickness direction increases from the attachment angle in a battery cell wherein the negative polarity material is oriented in the direction of the centrifugal force. However, if that angle of inclination is within 60 degrees, so long as a condition wherein excessive centrifugal forces act is avoided, the apparatus can be operated in a condition that is not problematic in practice, without suffering any extreme decline in the discharge capacity.

With the attachment method noted in the foregoing, when a battery cell wherein the battery case is formed as a flat shape is divided into two in the thickness direction, and the vacant capacity left after subtracting the volume occupied by the negative polarity material, the positive polarity material, and the separator from the volume in the battery case, in each of the divided portions, is computed, the vacant capacity of the divided portion on the side where the negative polarity material is located is smaller than that of the divided portion on the other side, and it is possible to attach the battery cell with this side having the smaller vacant capacity oriented in the direction of the centrifugal force. The decline in battery performance due to centrifugal forces acting on the battery cell results when liquid electrolyte is not sufficiently present at the surface of the negative polarity material during the course of electricity generating reactions. Accordingly, when the negative polarity material is on the side of the battery cell having the smaller vacant capacity, and the battery cell is attached so that this side is in the direction of the centrifugal force, a condition is maintained wherein the liquid electrolyte is present at the surface of the negative polarity material, wherefore the decline in battery performance due to centrifugal force is checked.

The battery cell attachment method of the present invention is a method for attaching a battery cell wherein positive polarity material and negative polarity material are placed in opposition through a separator in a battery case, and that battery case is packed with a liquid electrolyte, in an apparatus installed in a place acted on by centrifugal forces, wherein the negative polarity material side of the battery cell is oriented toward the direction in which centrifugal force acts on the apparatus, and the battery cell is loaded in a prescribed position in the apparatus using attachment means that regulate the battery cell loading direction so that the angle of inclination of the battery cell thickness direction relative to the centrifugal force direction is within a prescribed range. Thus the negative polarity material side of the battery cell is regulated so that it is oriented with respect to the direction of centrifugal force within a prescribed angular range, a state is obtained wherein the liquid electrolyte is sufficiently present when centrifugal force acts on the reaction surface of the negative polarity material, and the battery cell can be attached in a condition wherein battery performance does not decline due to centrifugal force.

The attachment means noted above are configured so that the battery cell can be loaded in such manner that the loading direction is regulated by a battery cell attachment structure wherein, of the positive polarity side and negative polarity side having mutually different outer shapes, only the shape on the side of one pole fits.

The battery cell used in the attachment method and attachment device noted in the foregoing is made by placing a positive polarity material formed primarily of either a metal oxide, halide, or sulfide, and a negative polarity material made primarily of either light metal or light metal alloy, so that they oppose each other through a separator made of a substance capable of withstanding temperatures in excess of 150° C., into a battery case that functions also as the positive terminal; packing a liquid electrolyte consisting of an organic solvent having a boiling point of 170° C. or higher into which is dissolved a solute, in which a lithium salt is used, between the positive polarity material and the negative polarity material; and sealing the opening in the battery case with a sealing plate that also functions as the negative terminal, with an intervening gasket that is resistant to organic solvents and resistant to temperatures in excess of 150° C. Thus, by forming the separator, gasket, and liquid electrolyte of materials capable of withstanding high temperatures, vaporization of the liquid electrolyte by high temperature is suppressed, and deterioration in the separator and gasket due to high temperature is prevented. Simultaneous exposure to high temperatures often occurs in environments acted on by centrifugal forces, wherefore battery cells having a heat-resistant structure are effective.

DESCRIPTION OF PREFERRED EMBODIMENTS

Embodiments of the present invention are now described, with reference to the attached drawings.

Figure 1:
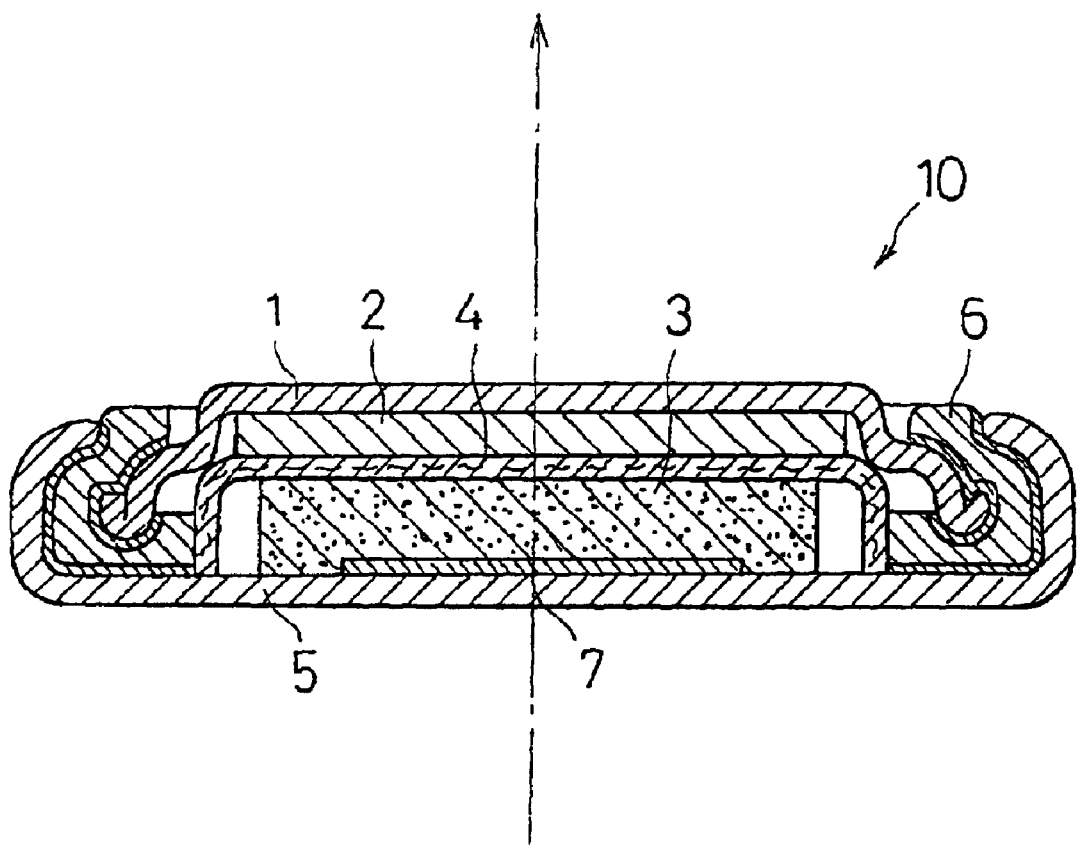
FIG. 1 is a cross-sectional view showing the configuration of a battery cell in an embodiment of the present invention.

The electricity generating elements of the battery cell are configured as the three basic elements of positive polarity material, negative polarity material, and liquid electrolyte. FIG. 1 shows an example of a graphite-lithium fluoride battery cell, which is formed in a flat shape and commonly called a button battery. A positive electrode 3 and negative electrode 2 configuring the electricity generating elements are stacked together with an intervening separator 4, and placed inside a battery case 5. The positive electrode 3 is formed as a disk that is made of a material of which main component is graphite fluoride, while the negative electrode 2 is formed as a disk made of lithium metal. The separator 4 is formed of a polypropylene unwoven fabric. This battery case 5 is filled with a liquid electrolyte that is obtained by dissolving a lithium salt as the solute into an organic solvent, thereby configuring the electricity generating elements as a graphite-lithium fluoride battery cell. Thereafter, the opening of the battery case 5 is sealed with a sealing plate 1. When effecting this seal, a gasket 6 is placed between the battery case 5 and the sealing plate 1 in order both to insulate the battery case 5 and the sealing plate 1 from each other and to enhance the airtight condition inside the battery case 5.

When such a battery case as this is used in a condition wherein it is acted on by a centrifugal force, it sometimes happens that the configurational balance between the electricity generating elements is destroyed by the flowing of the liquid electrolyte 10 in a direction of the centrifugal force, shown in FIG. 1 by the arrow depicted as a broken line and identified as reference numeral 7, leading to a decline in battery cell performance. Such conditions arise, for example, in applications wherein the battery cell is used as a power source in an apparatus installed in a revolving body such as an automobile tire in order to measure and monitor air pressure in the tire. The liquid electrolyte is interposed between the positive electrode 3 and the negative electrode 2 and contributes to the electrochemical reaction between the positive and negative electrodes. When this liquid electrolyte flows in the direction of the centrifugal force so that it favors one direction, the possibility that the electrochemical reaction cannot proceed normally arises.

Embodiments of a battery cell attachment method and attachment device for suppressing deterioration in battery cell performance caused by such centrifugal forces are now described.

In order to verify changes in battery cell performance due to centrifugal forces, battery cells were loaded and rotated in a revolving test machine, and the changes in discharge capacity caused by the centrifugal force of revolution were measured. The battery cells subjected to this test were the flat graphite-lithium fluoride battery cells (model symbol BR2330) diagrammed in FIG. 1, having an outer diameter of 23 mm and outer thickness of 3 mm. The discharge capacity of these battery cells was measured with a low resistance discharge of 15 kΩ at a room temperature of 25° C. Taking a discharge capacity of 255 mAh, in a condition where no centrifugal force is acting, as a discharge capacity utilization factor of 100%, the way in which this changed, according to the strength of the centrifugal force and the battery cell attachment angle, was measured. Verification of the discharge capacity was based on measurements of times required to arrive at a final discharge voltage of 2.0 V. Taking battery cell variation into consideration, this was calculated in terms of the mean value for 20 test cells. The ratio of battery space volume occupied by the liquid electrolyte in the battery cells used in this test was 42 vol %.

The results of the measurements made of discharge capacity (battery cell capacity) utilization rates according to the centrifugal force and the battery cell 5 attachment angle under these measurement conditions are listed in Table 1. The angle of battery cell attachment relative to the direction of centrifugal force 7 is assumed to be 0 degrees at the angle where the center axial direction from the center of the positive electrode 3 toward the center of the negative electrode 2 coincides with the centrifugal force direction 7, that is, at the angle where the plate face of the negative electrode 2 faces in the same direction as the direction of the centrifugal force 2, as diagramed in FIG. 1. This angle is assumed to be 180 degrees when this is inverted and the plate face of the positive electrode 3 faces in the same direction as the centrifugal force. The changes in discharge capacity were measured at all the angles between 0 degrees and 180 degrees, for each of various strengths of centrifugal force.

TABLE 1

Battery cell capacity utilization factor (%) according to centrifugal force and battery cell attachment angle

| Centrifugal force | Angle of inclination of battery cell thickness direction to centrifugal force direction | | | | | | | |
|---|---|---|---|---|---|---|---|---|
| | 0° | 20° | 45° | 60° | 90° | 120° | 135° | 180° |
| 1 G | 100 | 100 | 100 | 100 | 100 | 100 | 100 | 100 |
| 30 G | 100 | 100 | 100 | 100 | 100 | 100 | 99 | 98 |
| 50 G | 100 | 99 | 97 | 94 | 55 | 48 | 41 | 32 |
| 80 G | 100 | 95 | 92 | 90 | 46 | 37 | 23 | 11 |
| 150 G | 100 | 91 | 88 | 85 | 43 | 31 | 19 | 9 |
| 500 G | 100 | 89 | 82 | 77 | 39 | 29 | 17 | 5 |
| 1000 G | 100 | 87 | 75 | 71 | 36 | 24 | 13 | 2 |

As can be seen from the measurement results noted in Table 1, when the battery cell attachment angle is 90 degrees or greater, a large decline in discharge capacity is observed under centrifugal forces exceeding 50 G. resulting in conditions wherein normal battery cell performance cannot be realized. Accordingly, when the centrifugal force becomes large, a decline in discharge capacity will occur at any attachment angle other than 0 degrees. Therefore when loading the battery cell into an apparatus affected by centrifugal forces, it is necessary to attach it so that the negative plate face is oriented toward the direction of centrifugal force. When the attachment angle is less than 60 degrees, however, there is no excessive decline in the discharge capacity so long as no large centrifugal force is applied.

Hence, in an apparatus such as that for measuring air pressure in automobile tires, mentioned earlier, there will be little problem in practice so long as the battery cell is installed with an attachment angle of 60 degrees or less.

This decline in discharge capacity due to the application of centrifugal force is believed to be caused by a condition developing wherein liquid electrolyte necessary for discharge at the negative electrode that is the depolarized surface during discharge is not adequately present. This condition develops conspicuously in flat battery cells wherein a positive electrode and negative electrode are placed in parallel opposed to each other. Accordingly, it becomes possible to obtain normal operation even in conditions wherein centrifugal forces are acting by applying the attachment method described above not only to the graphite-lithium fluoride battery cells described but also to other types formed as buttons or paper forms.

The inventors also verified that, so long as the ratio whereby the liquid electrolyte occupies the battery cell space volume is within a range of 20 to 70 vol %, similar effects can be realized irrespective of the type of liquid electrolyte employed.

An attachment device for mounting a battery cell at the attachment angle noted above is now described.

Figure 2:
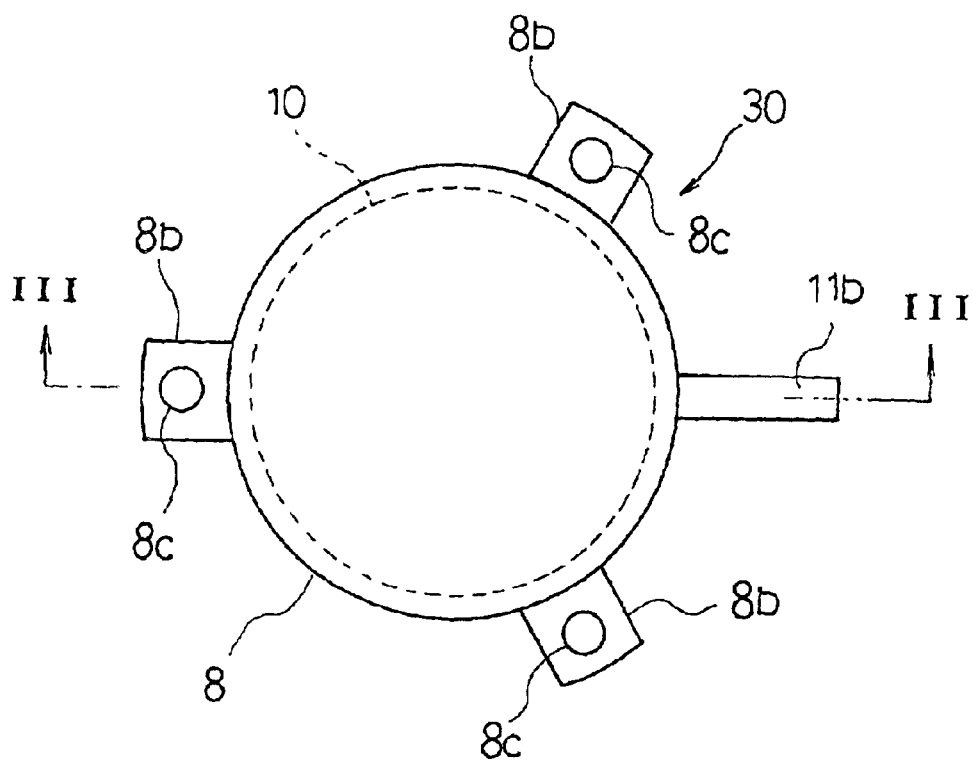
FIG. 2 is a plan view showing the configuration of a battery cell attachment device in the same embodiment.

In FIG. 2 is shown the configuration of an attachment device 30 for attaching a battery cell 10 in a circuit board 12 in an apparatus wherein the battery cell 10 is used as the power supply. The external shape of the battery cell 10 formed as a flat disk, as diagrammed in FIG. 1, wherein the radius of the circumferential corners are different on the negative electrode side and the positive electrode side, wherefore the attachment device 30 is formed with an inner surface shape corresponding to the shape of the negative electrode side of the battery cell 10, so that the battery cell 10 cannot be installed with the positive and negative orientations reversed. Accordingly, when this attachment device 30 is used in attaching the battery cell 10 to the circuit board 12, the attachment will always be made so that the negative electrode side of the battery cell 10 is oriented in a fixed direction.

Figure 3:
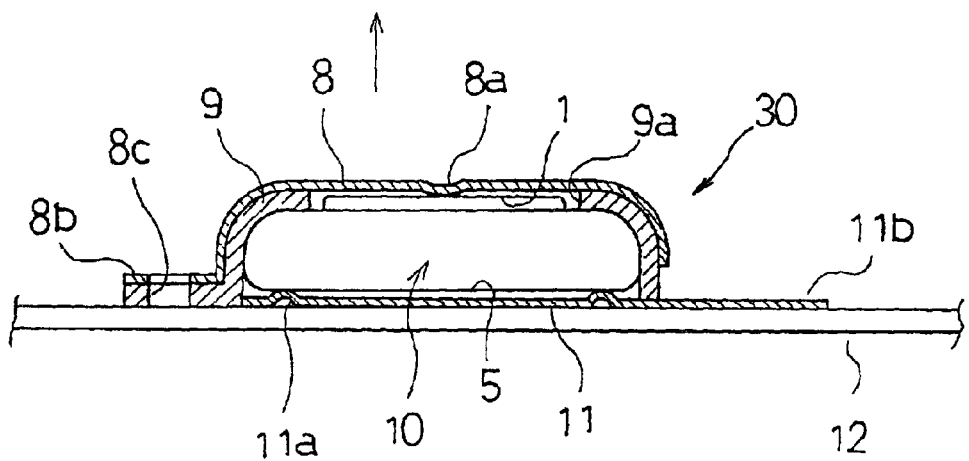
FIG. 3 is a cross-sectional view in the III—III plane indicated in FIG. 2.

As shown in FIG. 3, the attachment device 30 configuration comprises a positive electrode plate 11 that is in contact with the battery case 5 connected to the positive electrode 3 (cf. FIG. 1) of the battery cell 10, an attachment bracket 8 that is in contact with the sealing plate 1 connected to the negative electrode 2 of the battery cell 10, and an insulating cover 9 between the attachment bracket 8 and the battery case 5. The positive electrode plate 11, in addition to having the positive terminal 11b thereof soldered to a plus power supply line in the circuit pattern formed on the circuit board 12, is secured by an adhesive or the like onto the circuit board 12. A ring-shaped positive electrode contact projection 11a is formed in the part where the battery cell 10 is mounted, thereby effecting a stably conducting contact with the battery case 5 of the battery cell 10. The insulating cover 9 is formed by resin molding. In the middle thereof is formed an opening 9a for accommodating the sealing plate 1 of the battery cell 10. The inner surface shape thereof is formed so as to coincide with the radius shape on the negative electrode side of the battery case 5 and so as to fit into the negative electrode side of the battery cell 10. The attachment bracket 8 is formed, moreover, in a shape that covers the insulating cover 9. A conducting contact is effected with the sealing plate 1 inserted inside the opening 9a in the insulating cover 9 by a negative electrode contact projection 8a formed in the middle thereof. Attachment pieces 8b are formed at three locations about the periphery of the attachment bracket 8. By screwing the attachment bracket 8 down to the circuit board 12 using screw holes 8c, the battery cell 10 is securely mounted on the circuit board 12, and the negative electrode of the battery cell 10 is connected to a minus line in the circuit pattern formed on the circuit board 12.

This circuit board 12 is attached so that the attachment surface side of the battery cell 10 faces in the direction of the centrifugal force acting on the apparatus that is configured using the circuit board 12, whereby the negative electrode side of the battery cell 10 is oriented in the direction of the centrifugal force. That being so, battery cell performance is prevented from declining due to liquid electrolyte flow resulting from the centrifugal force, as described earlier. The battery cell 10 is held securely to the circuit board 12 by the attachment bracket 8, moreover, wherefore it can be prevented from being separated from the circuit board 12 by centrifugal force. Furthermore, even in cases where the negative electrode side of the battery cell 10 cannot be made to face in the direction of the centrifugal force, by making the attachment so that the negative electrode side is oriented so that it is within an angular range of at least 60 degrees with the direction of the centrifugal force, there will be no excessive decline in the discharge capacity, and the battery cell 10 can be used in a condition that presents no problems in practice.

As described in the foregoing, as based on the battery cell attachment method and device in this embodiment, the angle at which a battery cell is attached when mounted in an apparatus acted on by centrifugal forces is regulated, whereby the development of a condition wherein the liquid electrolyte is decreased at the negative electrode reaction surface by centrifugal force is suppressed, so that the battery cell can be operated normally even when acted on by centrifugal forces.

A battery cell attachment method that suppresses the decline in battery cell performance caused by the action of centrifugal forces can also be configured as described below.

Figure 4:
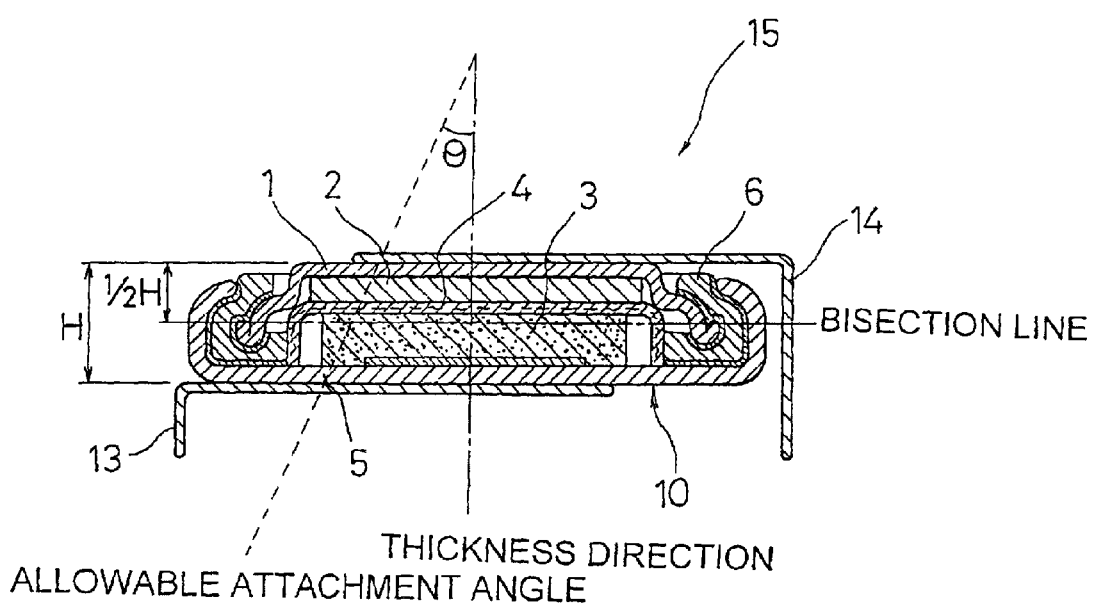
FIG. 4 is a cross-sectional view showing the configuration of a battery cell in an embodiment of the present invention.

In FIG. 4, a battery cell 15 is configured as a terminal-equipped battery cell wherein a positive terminal 13 and a negative terminal 14, respectively, are attached to the positive and negative electrodes in the battery cell 10 in the first embodiment. This battery cell 15 is attached to the circuit board by the positive terminal 13 and the negative terminal 14. What is fundamental here, however, in terms of the direction of attachment at this time, is that, when the bare battery cell 10 (which is the same as the battery cell 10, in the first embodiment) excluding the positive terminal 13 and the negative terminal 14, is divided into two in the thickness direction, as shown in the figure, the attachment is effected so that the side on which the vacant capacity inside the battery case 5 is smaller is oriented in the direction of centrifugal force.

The vacant volume mentioned above is the remaining volume in the battery cell space volume inside the battery case 5, after the batter case 5 has been sealed by the sealing plate 1, that is not occupied by the volume of the electricity generating elements accommodated therein. In the case of the graphite-lithium fluoride battery cell shown in FIG. 3, with an outer diameter of 23 mm and an outer thickness of 3 mm, the battery cell space volume is 761 μl. The volume of the fixed elements such as the positive electrode 3, negative electrode 2, and separator 4, etc., is 369 μl. The volume of the liquid electrolyte is 342 μl. Accordingly, the vacant volume is 50 μl, and the ratio of the battery cell space volume occupied by the liquid electrolyte is 45 vol %. When this battery cell 10 is divided into two in the thickness direction, it is the negative electrode 2 side on which the vacant volume becomes smaller. The vacant volume on this side is 12 μl. Conversely, it is the positive electrode 3 side on which the vacant volume becomes larger. The vacant volume is 38 μl on this side.

Thus, in a flat graphite-lithium fluoride battery cell it is the negative electrode 2 side on which the vacant volume becomes smaller. When the battery cell is attached so that this side is oriented in the direction of centrifugal force, within the prescribed angular range, the effects of centrifugal force can be suppressed.

As described in the foregoing, in cases where a battery cell is used as the power source for an air pressure measuring and monitoring apparatus in an automobile tire, at the same time that centrifugal forces are acting due to the revolution of the tires, the apparatus is subjected also to a high-temperature environment. When, for instance, an automobile is being driven down a hill under breaking, the temperature environment around the battery cell reaches the high temperatures of 100° C. to 150° C. When battery cells are installed in a revolving body such as a tire like this, it often happens that, in addition to the centrifugal forces, the effects of heat produced by friction, etc., cannot be avoided either.

When a conventional lithium cell is used or stored in a high-temperature environment at 70° C. or higher, or is subjected to heat shock loads, the polypropylene resin used as the separator and gasket material deteriorates due to heat-induced oxidation because the temperature at which the cell can be continuously used is approximately 65° C. Deterioration in the gasket causes gaps to develop in the seal, whereupon the liquid electrolyte leaks out or moisture enters from the outside, resulting in a decline in battery cell performance. In particular, when a low-boiling point solvent like DME is used as the solvent in the liquid electrolyte, the liquid electrolyte readily vaporizes at temperatures above 85° C. and escapes from minute gaps in the seal.

When exposed to such high-temperature environments as this, battery cells can be used if they have been given a heat-resistant structure. In FIG. 3, the material adopted for the separator 4 placed between the negative electrode 2 and positive electrode 3 is capable of withstanding temperatures in excess of 150° C. Such materials include glass fiber, polyphenylene sulfide (PPS) resin, vinylidene polyfluoride resin, polytetrafluoroethylene, polybutylene terephthalate (PBT) resin unwoven fabric, and ceramic fiber, etc. Suitable glass fiber will have a mean fiber diameter of 2 μm or less (preferably 0.3–1.5 μm), a weight per unit volume of 5.0 to 9.0 g/m², and a mean pore diameter of 3.0 to 7.5 μm. Suitable PPS fiber will have a mean fiber diameter of 30 μm or less (preferably 1.0–20 μm) and a weight per unit volume of 10.0 to 100.0 g/m². And suitable PBT fiber will have a mean fiber diameter of 15 μm or less (preferably 0.5–10 μm), a weight per unit volume of 25.0 to 100.0 g/m², and a mean pore diameter of 10.0 to 60.0 μm.

The material adopted for the gasket 6 placed at the seal between the sealing plate 1 and the battery case 5 should be resistant to temperatures in excess of 150° C. and also be resistant to organic solvents. Suitable materials include polyphenylene sulfide resins, polyether ketone resins, polyether ether ketone resins, polytetrafluoroethylene resins and vinylidene tetrafluoride resins, etc. For the liquid electrolyte, an electrolyte that is obtained by dissolving a lithium salt as a solute into an organic solvent or mixture of organic solvents having a boiling point of 170° C. or higher is used. The organic solvent or solvents used may be selected from among gamma butylolactone, propylene carbonate, ethylene carbonate, and butylene carbonate. In order to enhance high-temperature reliability, moreover, the organic solvent used may be either sulfolane or 3-methyl sulfolane, or a mixture of both, having a boiling point above 200° C.

Examples in which the materials noted above are used for the gasket 6, separator 4, and liquid electrolyte are listed in Table 2 below as Embodiments 1–6. Heat-resistance performance was verified by testing battery cells having the structures indicated for Embodiments 1–6 and Comparative Examples 1–6. This was a discharge test wherein, after storing the battery cells set at a discharge capacity of 255 mAh for 30 days in a high-temperature environment, they were discharged, at an ambient temperature of 20° C., through a discharge resistance of 30 kΩ, until a final discharge voltage of 2.0 V was arrived at. The results of measurements of discharge capacity and capacity survival rate in these tests are noted in Table 2. Twenty samples were used for each battery cell. The measured values represent mean values calculated for each set of 20 samples.

In order to verify the deterioration in the battery cells caused by heat shock, 100-cycle heat shock tests were conducted on battery cells configured as in Embodiments 1–6 and Comparative Examples 1–6, with each cycle including 2 hours at a low temperature of –20° C. and 2 hours at a high temperature of 80° C. for a total of 4 hours. The results of these tests, in which battery cell voltage failure rates and liquid electrolyte leakage rates were measured, are noted in Table 2. The number of samples used for each battery cell was 200, and the measurement results noted are mean values calculated for each set of 200 samples.

In Table 2, moreover, polyphenylene sulfide resin is noted as PPS, polyether ketone resin as PEK, polyether ether ketone resin as PEEK, polypropylene resin as PP, gamma butylolactone resin as GBL, dimethoxy ethane as DME, epoxy resin as EP, polyurethane resin as PU, and polyethylene terephthalate as PET.

Embodiments 1–6, however, which employ heat-resistant materials in the structural elements, the discharge capacity survival rate is 70% or higher, indicating that practically allowable battery cell performance can be maintained despite the harsh conditions.

As is also clear from the test results given in Table 2, in Comparative Examples 1–6, configured conventionally, voltage failures develop in the face of heat shock, and leakage developed in 100% of the battery cells in Comparative Examples 5 and 6. In the battery cells in Embodiments 1–6 in which heat-resistant materials are used for the structural elements, on the other hand, there was no occurrence of voltage failure at all, with only slight leakage observed in the battery cells of Embodiments 1 and 5. It is evident from these test results that, by adopting a configuration wherewith both the voltage failure rate and leakage rate are zero, as noted above, battery cell reliability in the face of heat shock can be improved.

The purpose of the embodiments of the present invention described in the foregoing is to elucidate the technical particulars of the present intention; the embodiments are not intended to limit the technical scope of the present invention. The present invention may be implemented in various different modifications within the scope set forth in the claims.

What is claimed is:

1. A method of attaching a battery cell in an apparatus acted upon by centrifugal force, comprising:
providing the battery cell which includes a positive polarity material and a negative polarity material which are placed in opposition in a battery case with an intervening separator disposed between the positive polarity material and the negative polarity material extending generally alone preference plane of the battery case, said battery cell further including a liquid electrolyte packed inside said battery case; and
mounting said battery cell in said apparatus, the battery cell being oriented such that a negative polarity material side of said battery cell faces generally in a direc-

TABLE 2

| | Gasket | Separator | Liquid electrolyte | Voltage failure rate | Leakage rate | Discharge capacity | Survival rate |
|---|---|---|---|---|---|---|---|
| Embodiment 1 | PPS resin | Glass fiber | GBL | 0 | 0.2 | 185 | 72.5 |
| Embodiment 2 | PPS resin | PPS fiber | GBL | 0 | 0 | 184 | 72.1 |
| Embodiment 3 | PEK resin | Glass fiber | GBL | 0 | 0 | 188 | 73.7 |
| Embodiment 4 | PEK resin | PPS fiber | GBL | 0 | 0 | 181 | 70.9 |
| Embodiment 5 | PEEK resin | PPS unwoven fabric | GBL | 0 | 0.1 | 182 | 71.3 |
| Embodiment 6 | PEEK resin | Glass fiber | GBL | 0 | 0 | 180 | 70.5 |
| Comparative Example 1 | PPS resin | PP unwoven fabric | GBL | 88 | 0 | 12 | 4.7 |
| Comparative Example 2 | PPS resin | Glass fiber | GBL + DME | 2 | 0.2 | 0 | 0 |
| Comparative Example 3 | PEK resin | PP unwoven fabric | GBL + DME | 100 | 0 | 0 | 0 |
| Comparative Example 4 | PEEK resin | PPS unwoven fabric | GBL + DME | 1 | 0 | 0 | 0 |
| Comparative Example 5 | PP resin | Glass fiber | GBL | 98 | 100 | 17 | 6.7 |
| Comparative Example 6 | PP resin | Glass fiber | GBL + DME | 100 | 100 | 0 | 0 |

As is evident from the test results noted in Table 2, in Comparative Examples 1–6, configured conventionally, the discharge capacity survival rate becomes zero or very small in a high-temperature environment. In the battery cells in tion in which said centrifugal force acts on said apparatus, and an angle of inclination of a thickness direction of said battery cell which runs perpendicular to said reference plane is within a range of 0 to about 60 degrees relative to the direction of said centrifugal force such that an extreme decline in discharge capacity of said battery cell is avoided when acted upon by the centrifugal force.

2. The method according to claim 1, wherein:

said step of providing includes configuring said battery case with a generally flattened shape which presents a thickness which is relatively smaller that an expanded dimension thereof, an interior of said battery case defining a first divided part and a second divided part within said battery case when bisected in the thickness direction thereof, said first and second divided parts corresponding respectively to a positioning of said negative polarity material and said positive polarity material, an interior of said battery case including a vacant volume defined by a volume remaining after respective volumes of the negative polarity material, the positive polarity material and the separator are subtracted from a total volume inside said battery case, a first portion of said vacant volume in said first divided part being smaller than a second portion of said vacant volume in said second divided part.

3. The method according to claim 1, wherein:

a main component of the positive polarity material is one of a metal oxide, halide and sulfide, a main component of the negative polarity material is one of light metal and light metal alloy, the separator is made of a substance capable of withstanding temperatures in excess of 150° C.;

the liquid electrolyte consists essentially of one of an organic solvent and a mixture of organic solvents having a solvent boiling point of 170° C. or higher into which a lithium salt is dissolved as a solute; and said step of providing includes sealing an opening in said battery case with a sealing plate using an intervening gasket between the battery case and the sealing plate that is resistant to temperatures in excess of 50° C. and resistant also to organic solvents.

4. The of method according to claim 3, wherein said separator is made of a substance selected from the group consisting of glass fiber, polyphenylene sulfide fiber, vinylidine polyfluoride resin, polytetrafluoroethylene resin, polybutylene terephthalate resin and ceramic resin.

5. The method according to claim 3, wherein said organic solvent is made of a substance selected from the group consisting of gamma butylolactone, ethylene carbonate, butylene carbonate, propylene carbonate, sulfolane and 3-methyl sulfolane.

6. The method according to claim 3, wherein said gasket is made of a substance selected from the group consisting of polyphenylene sulfide resin, polyether ketone resin, polyether ether ketone resin, polytetrafluoroethylene resin and vinylidene tetrafluoride resin.

* * * * *